United States Patent [19]

Maier

[11] 3,743,785

[45] July 3, 1973

[54] TELECOMMUNICATION SWITCHING SYSTEM EMPLOYING TIME DIVISION MULTIPLEX CONNECTIONS

[75] Inventor: Karl Maier, Stuttgart-Zuffenhausen, Germany

[73] Assignee: International Standard Electric Corporation, New York, N.Y.

[22] Filed: Feb. 14, 1972

[21] Appl. No.: 226,252

Related U.S. Application Data

[63] Continuation of Ser. No. 10,576, Feb. 11, 1970.

[52] U.S. Cl. ........................ 179/15 BM, 179/15 BA

[51] Int. Cl. .............................................. H04j 3/04

[58] Field of Search ..................... 179/15 A, 15 BA, 179/15 BM, 15 BW, 15 AP, 15 AT

[56] References Cited

UNITED STATES PATENTS 2,770,777 11/1956 Feissel ........................... 179/15 AP
3,159,720 12/1964 Bergmann ...................... 179/15 BW
3,226,485 12/1965 Schleftelowitz ................ 179/15 BW
3,435,148 3/1969 Yoshine ......................... 179/15 BM

FOREIGN PATENTS OR APPLICATIONS 1,023,801 7/1958 Germany ....................... 179/15 BM

*Primary Examiner*—Ralph D. Blakeslee
*Attorney*—C. Cornell Remsen, Jr., Delbert P. Warner et al.

[57] ABSTRACT

In a TDM-exchange involving space-division to time-division conversion lowpass filters associated with the space division transmission channels, as well as the subscriber line circuits, are connected via a time-division multiplex-operated switching grid via which the connections are through-connected at a scanning frequency which is higher than the scanning frequency on a modulation converter. This considerably reduces the expenditure for filters.

6 Claims, 10 Drawing Figures

TELECOMMUNICATION SWITCHING SYSTEM EMPLOYING TIME DIVISION MULTIPLEX CONNECTIONS

Figure 1:
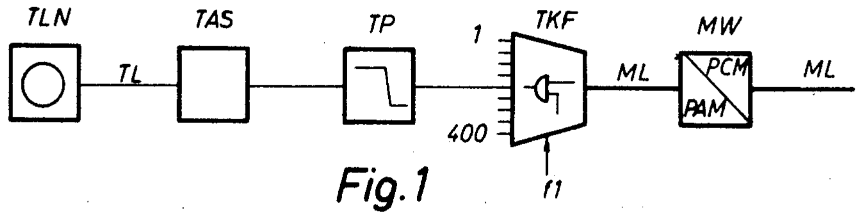

This is a continuation of application Ser. No. 10,576 Filed Feb. 11, 1970.

The present invention relates to a circuit arrangement for telecommunication switching systems, and more particularly to telephone switching systems for interconnecting time division and space division systems. It further involves the use of a switching grid and a modulation converter which are scanned at different frequency rates to make it possible for low-pass filters in space division lines to prevent undesirable high frequency signals forming modulation sidebands from being transmitted between the space division and the time division systems.

Conceptions for such types of exchanges often use pulse code modulation (PCM) on the transmission channels, and e.g. pulse amplitude modulation (PAM) or equivalent modulation methods within the exchange. Mixing of the traffic may be effected in the directional switching grid e.g. in a PCM- position. Both the concentration and the expansion of the traffic is effected in the subscriber switching grid. Proposals have also already become known in which both the transmission and the switching are carried out with PAM. To all of these variants, the invention is equally well applicable. When transmission is carried out with PCM or in accordance with any other digital modulation method then, in the following there is started out from the assumption that at any suitable point between the directional switching grid and the subscriber switching grid there is carried out a modulation conversion.

With respect to the subscriber switching grid various solutions have already been proposed. In one such solution an electronic subscriber switching grid operates in a time-division multiple at the same scanning frequency as the transmission lines. Per subscriber there is required one electronic crosspoint having access to different time slots. This solution requires a lowpass filter with steep flanks independently associated with each subscriber.

According to another solution the TDM channels are fanned out into a corresponding number of space-division channels, with a steep-flank type lowpass filter being independently associated with each channel, and the expansion or concentration respectively, being effected between the space-division channels and the subscriber lines within a space-division subscriber switching grid.

In this solution, of course, the investments involved for the lowpass filters are smaller because the latter, at a central point, are required in a small number of pieces, but the space-division switching network for the subscriber switching grid, however, is substantially more expensive than a time-division multiplex switching grid.

An object of the present invention is to provide a circuit arrangement requiring neither subscriber-assigned filters nor a space-division switching network.

The circuit arrangement according to the invention is characterized by the fact that the lowpass filters which are associated with the transmission channels, and the subscriber line circuits are connected with one another via a TDM-operated switching grid, in which the connections are through-connected at a substantially higher scanning frequency than the scanning frequency on the multiplex transmission lines, at least, however, at 1.5 times the scanning frequency.

The advantage of the circuit arrangement according to the invention is seen in that the expenditure is reduced substantially.

One particular embodiment of the circuit arrangement according to the invention is characterized by the fact that the scanning rate of the subscriber switching grid is so high that the disturbing modulation sidebands can be kept away from the subscriber line circuits by employing the most simple types of lowpass filters, for example, with the aid of RC-circuits. To this end it is already sufficient when the scanning rate or frequency of the subscriber switching grid is approximately double as high as the scanning frequency on the multiplex lines.

One further embodiment of the invention is characterized by the fact that the scanning frequency of the subscriber switching grid is so high that the modulation sidebands are lying outside the audible range, or outside the transmission range of the anyway existing telephone equipment respectively. In this case there is not required the termination of the modulation sidebands. In addition thereto, the repeater in the subscriber line circuit has such a frequency response as anyway not permitting the high frequencies of the modulation sidebands lying outside the audible range, to pass.

One particular embodiment of the circuit arrangement according to the invention is characterized by the fact that the scanning pulses of the subscriber switching grid have the same duration as the scanning pulses on the multiplex lines, and that the subscriber switching grid comprises several parallel multi-plex links on which the channels are through-connected in a group-wise fashion at the higher scanning frequency. It will always be appropriate to employ this type of solution whenever a shortening of the scanning pulses is impossible owing to the limiting or cut-off frequency of the lines and of the control equipment. In cases where this limit has not yet been reached by the duration of the scanning pulses on the multiplex lines, a simple solution for the circuit arrangement according to the invention resides in the fact that the scanning pulses of the subscriber switching grid are shorter than the scanning pulses on the multiplex lines, and that all channels of a multiplex transmission within the subscriber switching grid are through-connected on one multiplex link at the higher scanning frequency.

One particular embodiment of the circuit arrangement according to the invention for concentrators or PBX systems with a calling rate or traffic offered being substantially smaller than the traffic capable of being handled via a multiplex line, is characterized by the fact that on the multiplex line only certain predetermined channels are occupied, and that these channels within the subscriber switching grid are through-connected on a multiplex link at a higher scanning frequency and with the scanning pulses having the same duration. In this case, when enlarging the number of subscribers, additional multiplex links may be connected in parallel within the subscriber switching grid.

Figure 2:
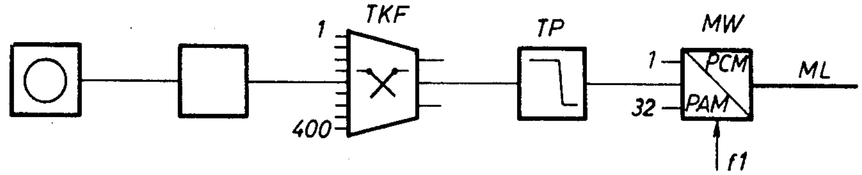
Figure 3:
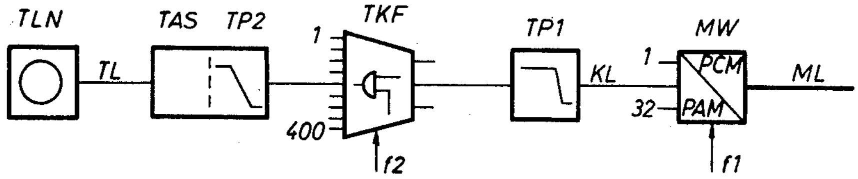
Figure 4:
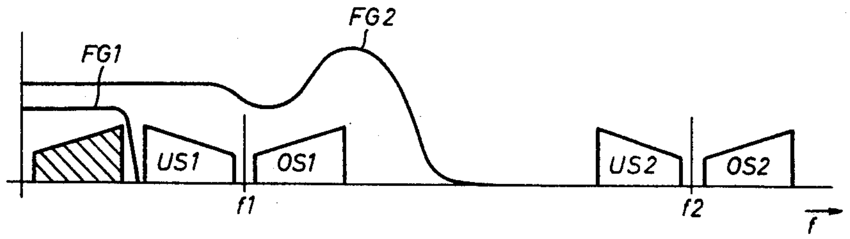
Figures 5A, 5B, 6A, 6B, 7A, 7B:
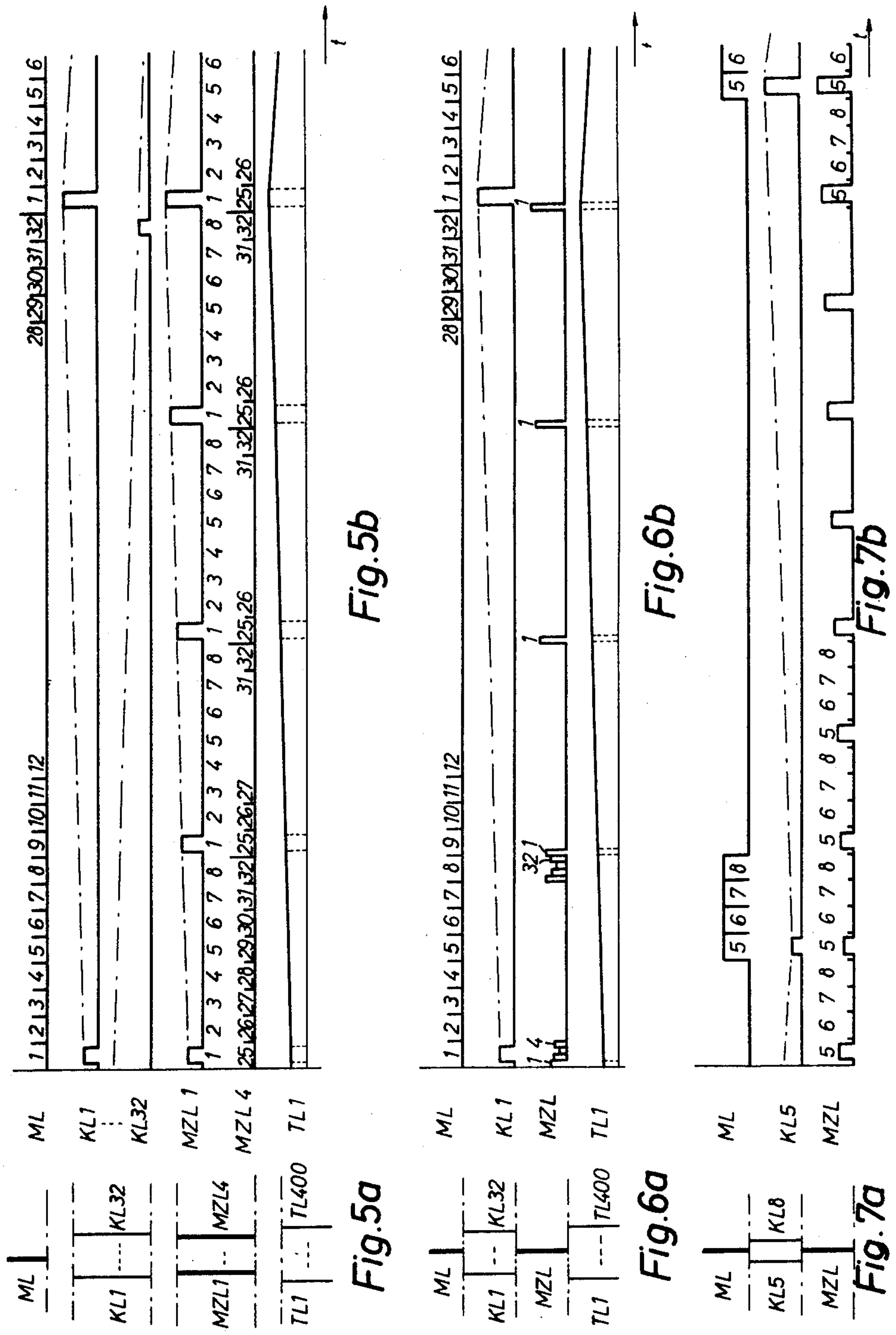

In the following the invention will now be explained in conjunction with the drawings, wherein the numerical values are only given by way of example. In these drawings:

FIG. 1 shows a simplified block diagram of an already proposed type of exchange employing the TDM through-connection, FIG. 2 shows a block diagram of another already proposed type of exchange, FIG. 3 shows a block diagram of the exchange according to the invention, FIG. 4 shows in a frequency diagram, signal distributions and attenuation curves, FIG. 5*a* schematically shows an example of embodiment relating to the line grouping for a circuit arrangement according to the invention, FIG. 5*b* shows the appertaining signal distributions relating to FIG. 5*a*, FIG. 6*a* schematically shows another example of embodiment relating to the line grouping, FIG. 6*b* shows the appertaining signal distribution relating to FIG. 6*a*, FIG. 7*a* schematically shows a third example of embodiment relating to the line grouping and, FIG. 7*b* shows the appertaining signal distribution relating to FIG. 7*a*.

In the exchange according to FIG. 1 there is started out from the assumption that the transmission from and to a not shown directional switching grid is effected via a multiplex line ML in the PCM-position. At a corresponding traffic volume there exist several such multiplex lines ML in parallel.

The scanning frequency of the channels of the multiplex line ML is fixed at $f1$ = 8 kHz in accordance with transmission engineering principles. This is based on an $1f$-band of 300 Hz to 3.4kHz to be transmitted. In a line-assigned modulation converter MW the speech signals to be transmitted, and the signals of all channels are converted from the PCM-position to the PAM-position, and vice versa. Expansion and concentration and, if so required, mixing of the traffic, as well as the internal traffic are effected or handled respectively, in an electronic subscriber switching grid TKF, in which the connections between the multiplex line ML and the individual subscribers lines TL are through-connected at the scanning frequency $f1$. A subscriber TLN is respectively connected via the subscriber line TL and a subscriber line circuit TAS, to one output of the subscriber switching grid TKF. In the example it has been assumed that 400 subscribers TLN are connected. In order to prevent the audible and, therefore, disturbing modulation sidebands occurring on account of the scanning, from reaching the subscriber TLN via the subscriber line circuit TAS, it is necessary to insert between each subscriber line circuit TAS and the corresponding output of the subscriber switching grid TKF one-line-assigned lowpass filter TP. These filters must have very steep flanks, which is still to be explained hereinafter with reference to FIG. 4, and involve a considerable expenditure.

In the exchange according to FIG. 2 the modulation converter MW additionally serves to solve the problem of performing the time-division to space-division conversion. Accordingly, the multiplex line ML terminates at the modulation converter MW. On the PAM-side of the modulation converter each channel appears on a line of its own within the space-division multiple.

The expensive low-pass filters TP are arranged in the lines 1 to 32 which are associated with the channels, hence exist in a substantially smaller number than in the circuit arrangement according to FIG. 1. Between the lines 1 to 32 and the subscriber lines 1 to 400, the calls are through-connected within the space-division multiple via the subscriber switching grid TKF. To this end there are required approximately 10 crosspoints per subscriber. Independently of the type of embodiment of the crosspoints, i.e. whether mechanical or electronic switches are employed, this expenditure almost eliminates the savings in filters.

In the circuit arrangement according to the invention as shown in FIG. 3, the modulation converter MW, just as in the circuit arrangement according to FIG. 2, has a double task. It serves to scan the channel-assigned lines 1 to 32 at the frequency $f1$ fed thereto, and then serves to convert the scanned signals from the PAM to the PCM-position. In the reverse, the PCM-signals of the multiplex line ML are converted into PAM-signals, and distributed to the individual lines 1 to 32. In the case of a four-wire mode of operation each repeater is provided with a modulation converter MW of its own.

Into each channel line KL there is inserted a steep-flank type of low-pass filter TP1 not permitting the passage of any frequencies lying above the speech frequency band ranging from 300 to 3,400 Hz. The left hand output of the lowpass filter TP1 is connected to one input of the electronic subscriber switching grid TKF. To the other side of the subscriber switching grid, in the present example, 400 subscribers TLN are connected via both their subscriber lines TL and subscriber line circuits TAS. In the subscriber switching grid TKF the calls are through-connected in time division at a higher frequency $f2$, than on the multiplex line ML. Quite depending on the selected frequency $f2$, it may still be necessary to insert a relatively inexpensive lowpass filter TP2 of the flat-flank type, into the subscriber line circuit TAS. If the frequency $f2$ including the lower modulation sideband, lies outside the audible range, no lowpass filter at all is required because, on one hand, the non-audible frequencies have no disturbing effect and, on the other hand, because the frequency response of the repeater in the subscriber line circuit TAS itself acts like a lowpass filter within this particular frequency range.

In the case of a two-wire operation on the multiplex lines ML, the expensive lowpass filter TP1 in the channel lines, may also be used in both ways of transmission, if so required, because in both directions there is only supposed to be transmitted the speech frequency band ranging between 300 and 3,400 Hz.

In FIG. 4 the speech frequency band to be transmitted is indicated symbolically by the hatch-lined area. On the multiplex lines and, in the circuit arrangement according to FIG. 1 also in the subscriber switching grid TKF, the connections are scanned at the frequency $f1$ which, in accordance with the scanning thereon, almost corresponds to double the frequency of the highest-frequency signal still to be transmitted. In order to prevent the lower modulation sideband US1 as appearing on account of scanning, from reaching the subscriber, and in order to perform a clipping of the transmitted frequency band, it is necessary to insert one or two very steep-flank type lowpass filters having a frequency response characteristic FG1, into each line. In the circuit arrangement according to FIG. 1 these expensive lowpass filters are lying in each individual subscriber line, and in the circuit arrangements according to FIGS. 2 and 3, only in the channel lines 1 to 32, hence at concentrated points.

Since the lower modulation sideband US1 and the upper modulation sideband OS1 are within the audible range, intelligibility would equal zero if they were permitted to reach the subscriber. According to the invention, however, for effecting the time-division through-connection in the subscriber switching grid TKF there is used at least such a high scanning frequency $f2$ that the lower or the upper modulation sidebands US2 or OS2 thereof, can easily be kept away from the subscriber by using inexpensive filters. In the example shown in FIG. 4, the scanning frequency $f2$ has straightaway been chosen so high that already the frequency response characteristic FG2 of the repeater in the subscriber line circuit will serve to keep the modulation sidebands US2, OS2 away from the subscriber.

In the following the FIGS. *5a* and *5b*, the FIGS. *6a* and *6b*, and the FIGS. *7a* and *7b* will be explained in common respectively.

In the line trunking as shown in FIG. *5a*, on one multiplex line Ml, the calls according to FIG. *5b* are transmitted in the 32 time division multiplex channels 1 to 32 in PCM or PAM-position respectively. On the following channel lines KL1 to KL32 each call is transmitted in PAM-position on one spatially separated line of its own. By the steep-flank lowpass filter as inserted in each channel line, there is reconstructed the $1f$-signal as denoted by the dot and dashlines in FIG. *5b*. This $1f$-signal is through-connected in the subscriber switching grid on four parallel multiplex links MZL1 to MZL4 at four times the scanning frequency. Thus, for example, on the multiplex link MZL1 there is effected the through-connection of the channels 1 to 8, and on the multiplex link MZL4 there is effected the through-connection of the channels 25 to 32. Other random distributions of the channels to the multiplex links are possible. Finally, the calls will occur on the subscribers lines TL1 to TL400 in a spatially separated manner as $1f$-signals. In the line trunking according to FIG. *5a* the scanning pulses on the multiplex links MZL1 to MZL4 may have the same duration as the scanning pulses on the multiplex line ML. In the line trunking according to FIG. *6a* there is proceeded from the fact that it is possible to effect the through-connection of the calls within the spatially concentrated subscriber switching grid with the aid of substantially shorter scanning pulses than on the multiplex line. On the multiplex line ML, according to FIG. *6b*, there again exist 32 time division channels 1 to 32. On the channel lines lines KL1 to KL32 the calls are separated spatially, and the $1f$-signals are recovered with the aid of the steep-flank lowpass filters. In the subscriber switching grid, however, there is only provided one single multiplex link MZL on which all of the 32 channels are through-connected likewise at four times the scanning frequency with respect to that on the multiplex line ML, but with at least four times shorter scanning pulses. On the subscriber lines TL1 to TL 400 there will again appear the $1f$-signal, with FIG. *6b* only showing the signal on the subscriber line TL1.

Line trunking according to FIG. *7a* almost corresponds to that according to FIG. *6a*. It has been assumed, however, that less traffic is to be transmitted via the multiplex line ML. This may be due to the fact that there are fewer subscribers, or that a smaller amount of traffic is generated by each of these subscribers. In any case, on the multiplex line ML there is only used a part of the existing time-division multiplex channels, e.g. the channels 5 to 8 in the example according to FIG. *7b*. Accordingly, there also only exist four channel lines KL5 to KL8 on which the $1f$-signals are restored. In this case it is possible in the subscriber switching grid to perform the through-connection of all four channels on one single multiplex link MZL at eight times the scanning frequency and at an unchanged scanning pulse duration.

It is common to all line trunkings according to FIGS. *5a*, *6a* and *7a* that no expensive filters are required in the individual subscriber lines, but for the channel lines.

What is claimed is:

1. A circuit arrangement for converting signals between space division and time division systems comprising a telecommunication switching system employing lowpass filters and a modulation converter connected together between a first plurality of lines carrying space division signals and a multiplex line carrying time division signals, said modulation converter employing a scanning rate of selected frequency to interconnect said space division and said time division signals, means connecting a first side of said modulation converter to the multiplex line to enable the reception and transmission of time division signals over said line, means connecting the second side of said modulation converter to said first plurality of space division lines to enable the reception and transmission of space division signals over said lines, a plurality of low pass filters coupled individually to said first plurality of space division lines, an electronic subscriber switching grid coupled to interconnect said low pass filters and a second plurality of space division lines, means coupling said second plurality of space division lines to individual subscriber line circuits, said second plurality of space division lines forming a larger group than the first plurality of space division lines, the said electronic subscriber switching grid compensating for differences in sample periods between said first and second pluralities of space division lines by employing a scanning rate of substantially higher frequency than the scanning frequency employed by the modulation converter.

2. A circuit arrangement according to claim 1, in which the scanning frequency of the electronic subscriber switching grid is selected of higher frequency so that generated disturbing modulation sidebands can be filtered from transmission to the subscriber line circuits through operation of lowpass filters represented by RC-circuits and repeaters.

3. A circuit arrangement according to claim 1, in which the scanning frequency of the time division multiplex-operated switching grid is selected of higher frequency so that generated modulation side-bands lie outside the audible range and outside the transmission range of existing telephone equipment.

4. A circuit arrangement according to claim 1, in which scanning pulses of the electronic subscriber switching grid are of the same duration as scanning pulses of the modulation converter and the electronic subscriber switching grid comprises several parallel multiplex links on which subscriber channels are through-connected in a groupwise fashion at said higher scanning frequency.

5. A circuit arrangement according to claim 1, in which scanning pulses of the electronic subscriber switching grid are shorter than the scanning pulses of the modulation converter, and all channels of a multiplex line in said time division multiplex-operated switching grid are through-connected on a multiplex link.

6. A circuit arrangement according to claim 1, arranged for use in concentrators having a traffic rate which is substantially smaller than the traffic rate capable of being handled via a multiplex line in which on said multiplex line only certain, predetermined channels are occupied, and that these channels, in said electronic subscriber switching grid are through-connected on a multiplex link with an unchanged scanning pulse duration and at a higher scanning frequency.

* * * * *